Sept. 1, 1970            R. H. BRAAS            3,526,312

ARTICLE CONVEYING DEVICE

Filed Sept. 23, 1968            3 Sheets-Sheet 3

Inventor:
RUDOLF HEINRICH BRAAS
By Young & Thompson
Attys.

United States Patent Office 3,526,312
Patented Sept. 1, 1970

3,526,312
ARTICLE CONVEYING DEVICE
Rudolf Heinrich Braas, Bad Homburg, Germany, assignor to Redland Tiles Limited, Reigate, Surrey, England, a British company
Filed Sept. 23, 1968, Ser. No. 761,746
Claims priority, application Germany, Sept. 23, 1967, 1,531,827
Int. Cl. B65g *13/02*
U.S. Cl. 198—167            11 Claims

---

ABSTRACT OF THE DISCLOSURE

The invention provides a device for the continuous conveying of moulds, particularly roofing tile bottom half moulds, having a frame provided with a guideway for the moulds, upper and lower subframes mounted on the frame for movement towards and away from the plane of the guideway, means to effect such movement of the subframes and at least one pair of wheels with resilient tyres mounted with one wheel on each of the subframes respectively, and means to drive at least one wheel of the pair to effect movement of moulds along the guideway.

---

The invention relates to a device for the continuos conveying of moulding bodies, particularly roofing tile bottom half moulds.

The object of the present invention is to provide a device which conveys moulding bodies, particularly roofing tile bottom half moulds, at a constant speed.

Accordingly, the invention provides a device for the continuous conveying of moulds particularly roofing tile bottom half moulds, having a frame provided with a guideway for the moulds, upper and lower subframes mounted on the frame for movement towards and away from the plane of the guideway, means to effect such movement of the subframes and at least one pair of wheels with resilient tyres mounted with one wheel on each of the subframes respectively, and means to drive at least one wheel of the pair to effect movement of moulds along the guideway.

Preferably, there are two pairs of wheels which are respectively mounted above and below the plane formed by the sliding guideway on two different shafts that are separately driven by the same motor.

The wheels may be secured to the shafts by means of ring tension sets.

It is preferred that the tyres of the upper wheel or wheels are air-filled rubber tyres that can withstand high strain.

It is further preferred that the tyres of the lower wheel or wheels consist of solid rubber or are air-filled rubber tyres that can withstand high strain.

Preferably, there is a main driving shaft for the wheels on each subframe, each of which main driving shafts is arranged between the shafts of the respective wheels and drives these shafts via chains, and in which there is a separate gearbox for each main shaft which is connected to the respective main shaft via a length-equalizing cardan shaft in such a way that, when the subframes move up and down, synchronism of the wheels is ensured.

Preferably, the lower subframes rests on several adjustable screws and can be moved up and down through rotation of the screws.

It is also preferred that between the lower subframe and the upper subframe there are installed several pneumatic, double-acting cylinders which move the upper subframe relatively to the lower subframe thereby making it possible to alter the space between the subframes.

Weights may be installed on the upper subframe.

A machine according to the invention is shown by way of example in the accompanying drawings in which.

Figure 1:
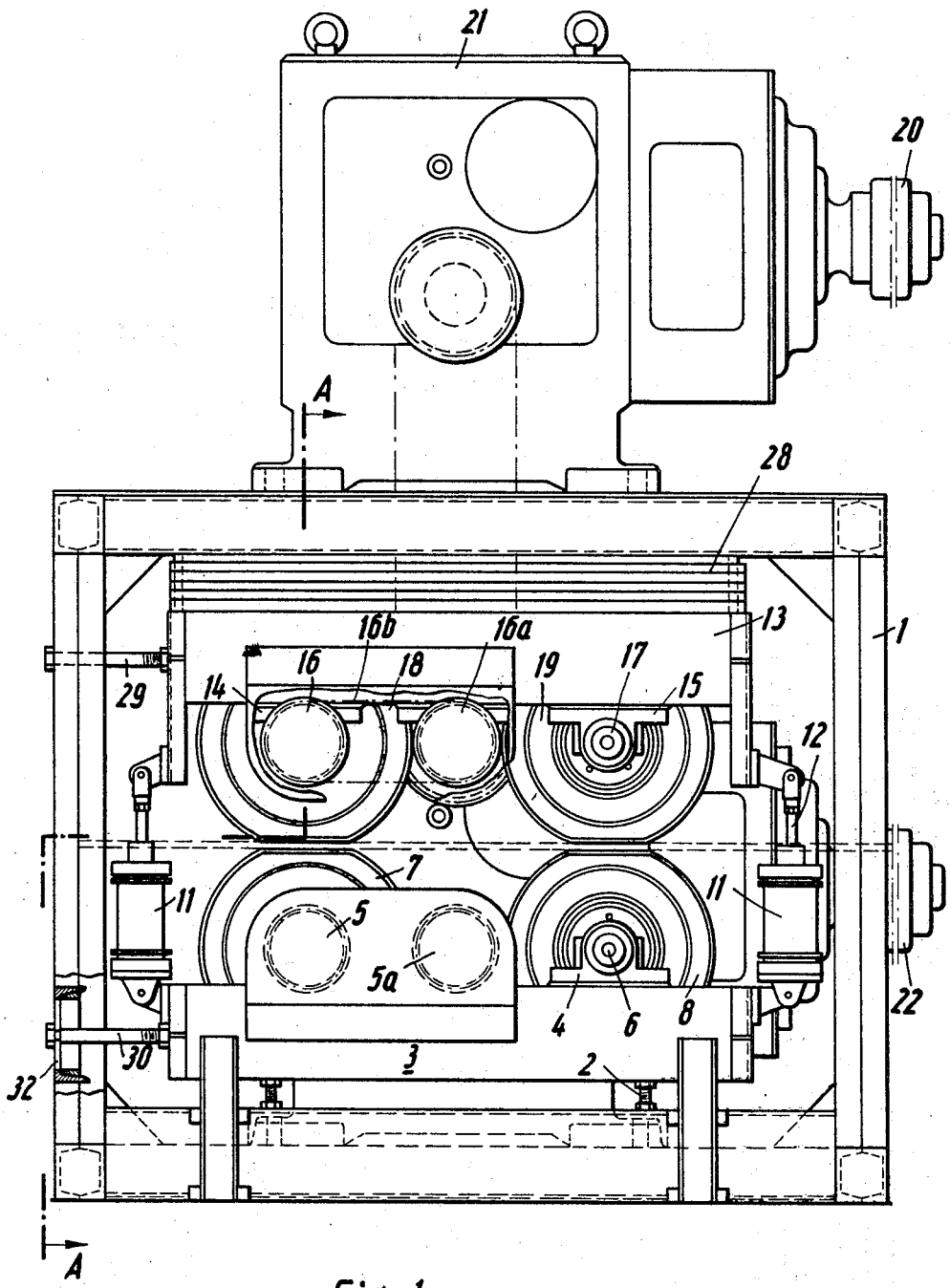
FIG. 1 is a side view of a mould conveying device.
Figure 2:
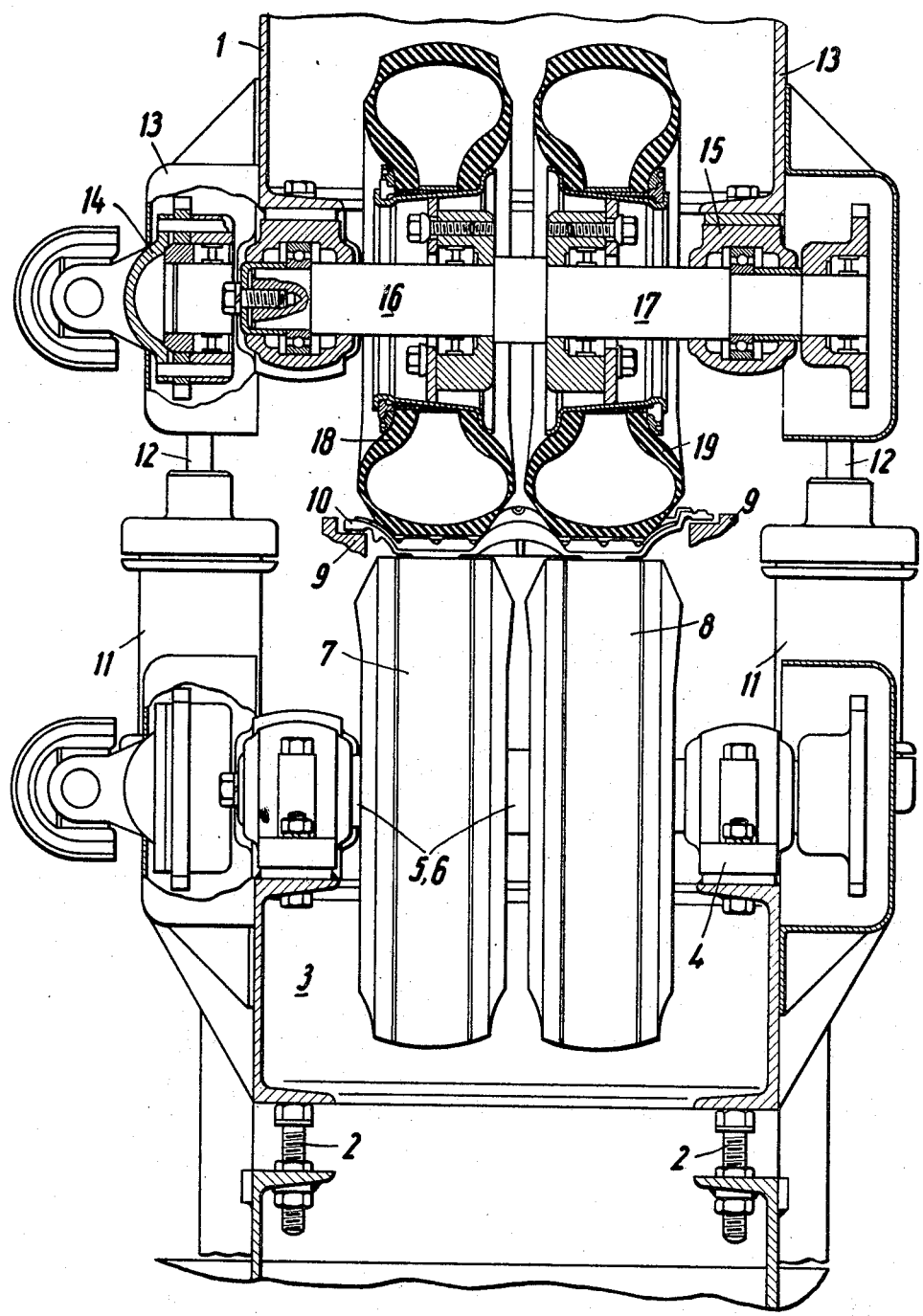
FIG. 2 is a cross section along the line A—A in FIG. 1.
Figure 3:
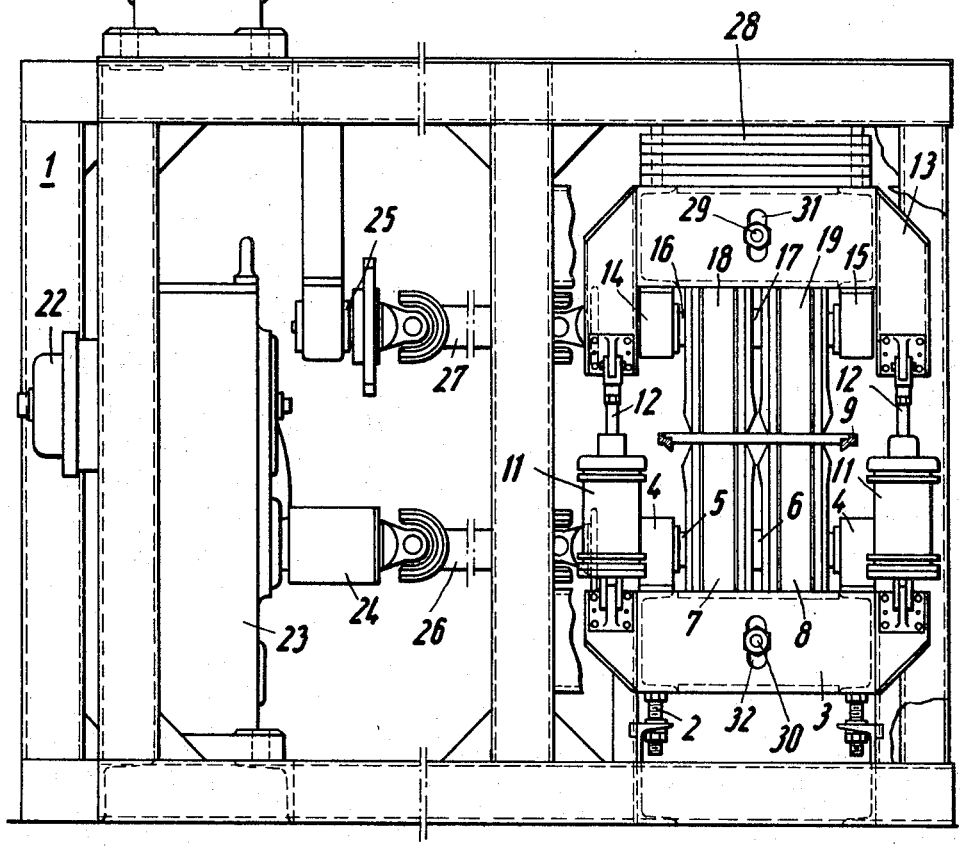
FIG. 3 is a front view of the whole device, including the transmission and the motor, seen counter to the moving direction.

Referring to the figures, four vertically adjustable screws 2 are arranged on a main frame 1, and support a lower subframe 3. Attached to the subframe 3 are bearings 4, in which are mounted shafts 5 and 6 each carrying a pair of wheels 7 and 8. Immediately above the wheels 7 and 8 is a guideway 9 which serves to guide bottom half moulds through the device. The guideway 9 is fixed to the main frame 1 so that a conveyor (not shown) which transports the bottom half moulds 10 onto the guideway needs no vertical adjustment.

The bottom half moulds 10 have a smooth underface when seen in a transverse section, and have a sharp profile on the upper, tile forming face.

At the corners of the lower subframe 3 are secured pneumatic cylinders 11 having pistons 12. The pistons 12 are connected to an upper subframe 13, so that the cylinders 11 may be used to control the position of the upper subframe 13 relative to the lower subframe 3. Bearings 14 and 15 are provided on the upper subframe 13, which bearings support shafts 16 and 17 each carrying a pair of wheels 18 and 19.

The wheels 7 are below the wheels 18, and the wheels 8 are below the wheels 19. Therefore by operation of the pneumatic cylinders 11 the wheels on the two subframes can be moved towards each other so as to grip a bottom half mould 10 between wheels 7 and 8 on its lower surface and wheels 18 and 19 on its upper surface. By rotation of the wheels successive moulds 10 can be driven along the guideway 9 in a smooth continuous manner. No extra load is thereby placed on the supporting screws 2, as the force required to grip the moulds is provided by the cylinders 11 and pistons 12, which are attached to and operate on the subframes 3 and 13 which are both supported entirely by the screws 2.

Between the shafts 16 and 17 is mounted a main driving shaft 16a, from which the drive is taken to shaft 16 by a chain 16b. Shaft 17 is driven by a similar chain (not shown). In a similar manner, shafts 5 and 6 are driven by chains from a main driving shaft 5a. To keep the device compact, the wheels 7, 8, 18, 19 are carried on their respective shafts by ring tension sets located within the hubs of the wheels. In the embodiment shown, the wheels are equipped with pneumatic tyres which are capable of taking high stress, but these may be replaced by other types, such as solid rubber tyres.

The main shaft 5a is driven by a motor 22 through a gearbox 23, both the motor 22 and the gearbox 23 being secured to the main frame 1. Between the gearbox output shaft 24 and the driving shaft 5a there is provided a cardan shaft 26, so that the subframe 3, carrying the driving shaft 5a, may be moved vertically without affecting the drive-system. In a similar manner driving shaft 16a is driven by a motor 20 through a gearbox 21 and a chain (not shown) to shaft 25, and by a cardan shaft 27 from shaft 25 to the driving shaft 16a. Thus both driving shafts 5a and 16a, and therefore wheels 7, 8, 18, 19 are driven irrespective of the vertical positions of the subframes 3 and 13.

The force required to drive the moulds 10 along the guideway results in a longitudinal force on the subframes 3 and 13, and tie rods 29, 30 are provided to counteract this. Weights 28 may be placed on the subframe 13 to supplement the force exerted by the cylinders 11.

It will be noticed that the screws 2 only have to support the subframes 3 and 13, with their associated bearings, shafts, wheels, pneumatic cylinders, etc., and the weights 28. The force system between the two sub-frames is, as mentioned above, self-contained except for the effect of the weights 28. The support system can therefore be comparatively light and simple.

Before operation of the machine it is necessary to adjust the height of the subframe 3 by means of the screws 2 to ensure that the plane in which the moulds 10 are supported by the wheels 7, 8, 18 and 19 is the plane of the guideway 9.

An advantage of the conveying device described above is that it conveys moulds with a continuous action and thus at a constant speed. Such an action is advantageous in that it does not transmit, like some known forms of devices, recurring impacts to the moulds which impacts have been found to result in cracks being formed in the roofing tiles that are subsequently produced from the moulds. The even rate of feed is also advantageous in that it avoids the necessity for the driving motor and the transmission to attain successive peaks of energy. As a result, it is possible to provide a device having increased output performance in relation to the mean value of the feeding force.

I claim:

1. A device for the continuous conveying of moulds, particularly roofing tile bottom half moulds, having a frame provided with guide means forming a guideway for supporting the moulds upper and lower subframes mounted on the frame for movement towards and away from the plane of the guideway, means to effect such movement of the subframes, and at least one pair of wheels with resilient tyres mounted with one wheel on each of the subframes respectively so as to frictionally engage moulds upon the guide means, and means to drive at least one wheel of the pair to effect movement of moulds along the guideway.

2. A device according to claim 1, in which there are two pairs of wheels which are respectively mounted above and below the plane formed by the guideway on two different shafts that are separately driven by the same motor.

3. A device according to claim 2 in which the wheels are secured to the shafts by means of ring tension sets.

4. A device according to claim 2 in which there is a main driving shaft for the wheels in each subframe, each of which main driving shafts is arranged between the shafts of the respective wheels and drives these shafts via chains, and in which there is a separate gear box for each main shaft which is connected to the respective main shaft via a length-equalizing Cardan shaft in such a way that, when the subframes move up and down, synchronism of the wheels is ensured.

5. A device according to claim 1, in which the tyre of the upper wheel is an air-filled rubber tire that can withstand high strain.

6. A device according to claim 1, in which the tyre of the lower wheel consists of solid rubber.

7. A device according to claim 1, in which the tire of the lower wheel is an air-filled rubber tire that can withstand high strain.

8. A device according to claim 1, in which the lower subframe rests on several adjustable screws and can be moved up and down through rotation of the screws.

9. A device according to claim 1 in which between the lower subframe and the upper subframe there are installed several pneumatic, double-acting cylinders which move the upper subframe relatively to the lower subframe thereby making it possible to alter the space between the subframes.

10. A device for the continuous conveying of moulds particularly roofing tile bottom half moulds, having a frame provided with guide means forming a guideway for supporting the moulds upper and lower subframes mounted on the frame for movement towards and away from the plane of the guideway, means to effect such movement of the subframes, weights installed on the upper subframe, at least one pair of wheels with resilient tires mounted with one wheel on each of the subframes respectively so as to frictionally engage the moulds upon the guide means, and means to drive at least one wheel of the pair to effect movement of moulds along the guideway.

11. A device for the continuous conveying of roofing tile bottom half moulds comprising a main frame provided with guide means forming a guideway for supporting the moulds upper and lower subframes mounted on slides on the main frame, the lower subframe being movable towards or away from the plane of the guideway, the upper subframe being connected to the lower subframe so as to be movable towards or away from the lower subframe, in which the upper and lower subframes each support two shafts which shafts carry opposed pairs of wheels having rubber pneumatic tyres that can withstand high strain, said wheels being frictionally engageable with moulds upon the guide means to effect movement of the moulds along the guideway, the shafts of each subframe being driven from a main shaft intermediate the aforesaid shafts by means of chains and there being a separate gearbox for each main shaft.

References Cited
UNITED STATES PATENTS

| | | | |
|---|---|---|---|
| 1,289,275 | 12/1918 | Sargent | 25—99 |
| 3,313,010 | 4/1967 | Betz | 25—99 |
| 3,107,778 | 10/1963 | Jordan | 198—137 |

EVON C. BLUNK, Primary Examiner

R. S. GAITHER, Assistant Examiner

U.S. Cl. X.R.

25—43, 99; 198—127, 137